US006782345B1

(12) United States Patent
Siegel et al.

(10) Patent No.: US 6,782,345 B1
(45) Date of Patent: Aug. 24, 2004

(54) SYSTEMS AND METHODS FOR DIAGNOSING ELECTRONIC SYSTEMS

(75) Inventors: Robert P. Siegel, Penfield, NY (US); Stephen C. O'Leyar, Fairport, NY (US); Bradley P. Gerner, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 582 days.

(21) Appl. No.: 09/678,319

(22) Filed: Oct. 3, 2000

(51) Int. Cl.⁷ .......................... G06F 11/30; G21C 17/00
(52) U.S. Cl. .................. 702/183; 702/122; 702/188; 399/8; 399/18
(58) Field of Search ................ 702/34, 35, 57–59, 702/81, 108, 113, 115, 117–122, 182–185, 187, 188; 399/8, 9, 18; 358/1.14; 340/3.1, 3.43

(56) References Cited

U.S. PATENT DOCUMENTS

| | | | | |
|---|---|---|---|---|
| 4,192,451 A | * | 3/1980 | Swerling et al. | 714/732 |
| 4,241,406 A | * | 12/1980 | Kennedy et al. | 346/33 R |
| 5,057,866 A | * | 10/1991 | Hill et al. | 399/8 |
| 5,101,491 A | * | 3/1992 | Katzeff | 703/22 |
| 5,313,253 A | | 5/1994 | Martin et al. | 399/16 |
| 5,347,518 A | * | 9/1994 | Lee | 714/38 |
| 5,371,692 A | * | 12/1994 | Draeger et al. | 702/122 |
| 5,512,979 A | | 4/1996 | Ogura | 399/8 |
| 6,268,733 B1 | * | 7/2001 | Abbata et al. | 324/511 |
| 6,473,788 B1 | * | 10/2002 | Kim et al. | 709/209 |
| 6,510,389 B1 | * | 1/2003 | Winkler et al. | 702/6 |
| 6,584,430 B1 | * | 6/2003 | Rosenbaum et al. | 702/183 |

FOREIGN PATENT DOCUMENTS

| | | |
|---|---|---|
| EP | 0 599 606 A2 | 6/1994 |
| EP | 0 895 399 A1 | 2/1999 |

* cited by examiner

*Primary Examiner*—Marc S. Hoff
*Assistant Examiner*—Manuel L Barbee
(74) *Attorney, Agent, or Firm*—Oliff & Berridge, PLC

(57) ABSTRACT

During the operation of an electronic system, such as a document processing system, machine and job data of the electronic system are collected by a diagnostic system for automated diagnosis or prognosis. Optionally, machine data and population based data are acquired from a database or server. According to one embodiment, the data is analyzed to determine an initial diagnosis of the electronic system. Based on the initial diagnosis, a determination is made whether a remote transmission is needed. If so, the data is sent via a distributed network to a remote diagnostic system for analysis. At least part of the collected machine data may be a signature waveform of a part of the electronic system. In such a case, at least the analysis by the remote diagnostic system includes signature analysis of the waveform. Based on the analysis of the data by the remote diagnostic system, a communication is sent. The communication may be one or more of a repair information sent to a customer, a parts request sent to an appropriate entity, a service request notification to a customer service engineer and a revised set of operating instructions sent to the electronic system. The communication may be sent via the distributed network. If the communication is a revised set of operating instructions sent to the electronic system, the diagnostic system preferably verifies that the electronic system using the revised set of operating instructions is within specification.

27 Claims, 11 Drawing Sheets

SYSTEMS AND METHODS FOR DIAGNOSING ELECTRONIC SYSTEMS

BACKGROUND OF THE INVENTION

1. Field of Invention

This invention relates to diagnosis/prognosis and remediation of electronic systems.

2. Description of Related Art

Customer satisfaction can be improved and maintenance costs reduced when problems with electronic systems or devices, such as document processing systems or devices including copiers, printers, scanners, facsimile machines and the like, can be fixed before the problems become serious enough to warrant a service call by the customer. Conventional systems enable such devices to call for service automatically when sensors detect certain operating parameters outside of permissible ranges.

In these conventional systems, telephone lines and modems are used by the devices to call a service center and report operating condition status and device usage data. This provides the customer information about how their devices are being used and provides the service center with information about operation of the devices.

The information used by a particular device for diagnosis of that device consists entirely of digital fault codes, which are stored in the device's non-volatile memory. The digital fault codes are generated by a control system of the device that monitors and analyzes the real-time operation of the device. Each digital fault code is a parameterized "snapshot" of the device at a given instance of time. The digital fault codes are carefully designed and selected so that a great deal of information may be extracted from each digital fault code.

SUMMARY OF THE INVENTION

The systems and methods of this invention provide for automated diagnosis/prognosis and remediation of failures or potential failures in electronic systems.

In various exemplary embodiments, the systems and methods of this invention automatically transmit operating data about an electronic system or device, such as an analog or digital copier, a printer, a scanner, a facsimile, and the like, so that a remote diagnosis of the system or device is carried out by a diagnostic system using the transmitted data.

The systems and methods of this invention separately and independently provide for automated diagnosis/prognosis and remediation of failures/malfunctions or potential failures/malfunctions in electronic systems or devices in which diagnosis/prognosis is performed by signature analysis.

The systems and methods of this invention separately and independently provide for automated diagnosis/prognosis and remediation of failures/malfunctions or potential failures/malfunctions in electronic systems or devices in which signature analysis is performed by a remote diagnostic expert system.

The systems and methods of this invention further provide for automated diagnosis/prognosis and remediation of failures/malfunctions or potential failures/malfunctions in electronic systems or devices in which an entire waveform is sent to the remote diagnostic system for analysis.

The systems and methods of this invention separately and independently determine and execute an appropriate action based on the results of the diagnostic analysis. Such actions could include, for example, guiding the customer through a repair procedure, automatic scheduling or dispatch of service, parts and/or consumables and automated remediation of faults, for example, as discussed in copending U.S. application Ser. No. 09/464,597, which is incorporated herein by reference in its entirety.

Additionally, this invention separately provides systems and methods that present the results of the failure prediction, diagnosis or remediation, locally, or, remotely, such as, for example, on a computer user interface, via e-mail, via a web page, via a paging service or cellular phone, or the like, and that store the results, for example, in one or more databases, servers, or device history logs. Therefore, in various exemplary embodiments, the systems and methods of this invention are capable of performing intelligent self-diagnosis, correction and notification of device failure or malfunction.

This invention separately provides systems and methods that determine whether a remote transmission is required for diagnosis. In various exemplary embodiments, a preliminary analysis of device operating data is performed to determine whether a remote transmission is required.

This invention separately provides systems and methods that automatically diagnose and/or predict machine failures or malfunctions based on a device operating data.

This invention separately provides systems and methods that determine an appropriate action based on the results of the diagnostic/prognostic analysis.

This invention separately provides systems and methods that allow an automatic scheduling of service, parts and/or consumables to be provided to an electronic system.

This invention separately provides systems and methods that guide a customer through a repair procedure.

This invention separately provides systems and methods that allow an automated remediation of faults, either completely or partially, and with or without human intervention.

This invention separately provides systems and methods for presenting the results of the failure prediction, diagnosis or remediation either locally or remotely.

This invention separately provides systems and methods that allow electronic systems to be interrogated and controlled remotely over a network for acquiring data usable in failure prediction, diagnosis and/or remediation.

This invention additionally provides systems and methods that pool data related to a plurality of electronic systems to accomplish failure prediction, diagnosis and remediation of distributed electronic systems.

In various exemplary embodiments, at any point during the operation of an electronic system, the diagnostic/prognostic systems and methods of this invention can be invoked. At this time, device and job data are collected from the electronic system. The device information can be obtained from the device that is being diagnosed and/or from one or more knowledge servers or databases that contain device specific information. Additionally, population information from a fleet of similar devices may be obtained via a network connection. Having accumulated the job data and device data, a preliminary analysis is performed to determine an initial diagnosis of the electronic system.

After obtaining the initial diagnosis, the diagnostic system determines whether a remote transmission is required. If a remote transmission is required, the data is transmitted to a remote diagnostic system. Then, the remote diagnostic system analyzes the data and outputs results of the analysis. The output results can be a request for either a customer repair action or a customer service engineer repair action, or, alternatively, a revised set of operating parameters to correct a failure or prevent a potential failure. Upon completing one or more, or any combination, of these actions, the device verifies its operation and again checks to ensure the repairs have been completed successfully.

It should be noted that, at any time during the diagnostic or remediation process, additional data can be obtained from the electronic system or device by interrogating or controlling the device.

These and other features and advantages of this invention are described in or are apparent from the following detailed description of various exemplary embodiments.

BRIEF DESCRIPTION OF THE DRAWINGS

Various exemplary embodiments of the invention will be described in detail, with reference to the following figures, wherein.

DETAILED DESCRIPTION OF EXEMPLARY EMBODIMENTS

Figure 1:
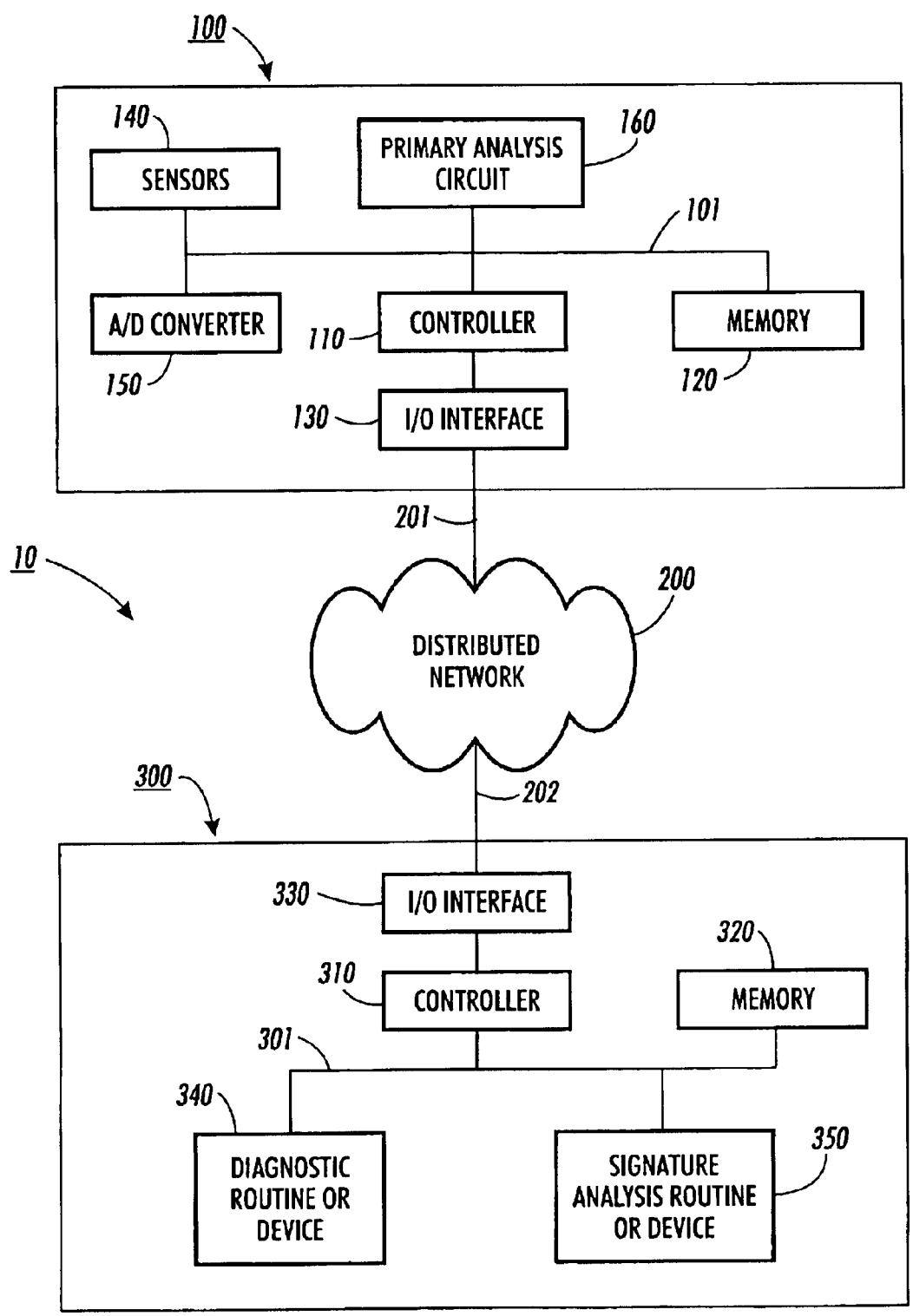
FIG. 1 is a functional block diagram illustrating a first exemplary embodiment of the diagnostic system according to this invention.

In an electronic system, such as a document processing system, e.g., a printer, a copier, a scanner, a facsimile machine or a multifunction device incorporating one or more of these document processors, remote diagnosis and/or prognosis is highly desirable. Such diagnosis/prognosis allows a central remote diagnostic system to be used to monitor and service multiple systems or devices, for example, in networked devices and other enterprise-level systems. Locating the computing power for data analysis in the central remote diagnostic system rather than locally in each device allows the computing power to be increased without a proportional increase in costs. Further, updating the hardware and software with advances in technology can be accomplished more readily and at a reduced cost.

With increased computing power, more complex data analysis, diagnosis, prognosis and remediation becomes possible. Thus, the systems and methods of this invention facilitate advanced diagnosis/prognosis of electronic systems.

According to various embodiments of the systems and methods of the invention, a data acquisition and processing circuit collects and processes data pertaining to at least one electronic system or device. A diagnostic circuit analyzes the data from the data acquisition and processing circuit to obtain an initial diagnosis. The initial diagnosis may be relatively simple, involving relatively light analysis, so that limited amounts of computing power are required at the local level.

The initial diagnosis is used to determine whether further diagnosis is warranted. For example, the initial diagnosis may be used to screen minor fluctuations in operating data that do not require remediation by setting various thresholds. If the initial diagnosis indicates that further diagnosis, and possibly remediation, is needed, a data transmission circuit sends the data via a distributed network to a remote diagnostic system.

The remote diagnostic system analyzes the data and sends a communication based on the analysis. The communication may be sent via the distributed network. Further, the communication may include one or more of repair information to a customer, a parts request to an appropriate entity, a service request notification to a customer service engineer and/or a revised set of operating instructions to the electronic system or device. The repair information may be displayed to the customer to provide information and/or instructions for remediation of current or potential failures of the device. The parts request may order additional supplies, e.g., toner and the like, or may order actual parts of the device that have failed or are predicted to fail. The service request notification may apprise the customer service engineer to allow the customer service engineer to schedule a service call before the device becomes inoperative or performs unsatisfactorily. The revised set of operating instructions may adjust the device to prolong satisfactory performance and allow time for a service call to be made before actual failure of the device. The revised set of operating instructions may correct the problem or potential problem and thus avoid a service call altogether.

In various exemplary embodiments, the analysis by the diagnostic circuit and the remote diagnostic system are based on at least one of a threshold analysis, a statistical analysis, a signature analysis, a trend analysis, a timing analysis, an event sequence analysis, a pattern analysis, an image processing technique, a quantitative state estimation technique and/or a qualitative state estimation technique, model-based diagnostic technology, a look-up table, a neural-network-based analysis, a fuzzy-logic-based analysis, a bayesian network, a causal network, a rule-based system analysis and/or an expert system.

In various exemplary embodiments, the remote diagnostic system analyzes the data using signature analysis. In such a case, the data acquisition and processing circuit comprises at least one analog sensor that detects a signature waveform of a part of the at least one electronic system and an analog-to-digital converter that digitizes the signature waveform. The data transmission circuit sends the digitized waveform via the distributed network to the remote diagnostic system based on the initial diagnosis, as described above. Based on the signature analysis of the digitized waveform, the remote diagnostic system then sends a communication, as described above.

The diagnosis/prognosis systems and methods of the invention may be invoked whenever the electronic system's performance is unsatisfactory to a customer, when preventative maintenance is desired, or periodically. In particular, the diagnosis/prognosis can be initiated by the electronic system or device itself or can be initiated by a user or other operator, or by a diagnostic server residing on the distributed network. The first step in diagnosing and/or predicting a system problem is to collect and analyze relevant device data. Such data includes, but is not limited to, control data, such as commands issued by system and subsystem controllers, scheduling and timing data, set-point and actuator data, sensor data, state estimate data and the like; diagnostic data, such as fault counts, error counts, event counts, warning and interlock counts, calibration data, device set-up data, high frequency service item information, service history data, device history data, value-added diagnostic data such as trend information, component signatures, qualitative state estimates, quantitative state estimates and the like; and/or job related data, such as copy counts, percentage area coverage, document size and type and the like. In particular, the data can be in the form of analog signature waveforms derived either from a scaled representation of the current required to drive a device or component or from on-board transducers or sensors. The data can also include environmental conditions such as temperature and humidity of the operating environment, and device usage information such as, for example, the type and frequency of device usage, and device configuration information.

Virtual sensors may be used to augment the information provided by real sensors on the device. This may be necessary to diagnose device failures down to an individual component, an easily replaceable unit, or a customer replaceable unit, since typically more device information than that provided by on-board sensors is needed. Such virtual sensors are disclosed in copending U.S. application Ser. No. 09/464,596, which is incorporated herein by reference in its entirety.

This data collection can occur in real time, for example, as the user is using the device, or, during a special diagnostic "stress mode" or test mode; where the device is exercised appropriately to extract useful diagnostic information that may otherwise be unavailable in the normal device operation mode.

Alternatively, the data collection can occur on an ongoing basis before service of the device is attempted, or even when the machine is in a limp-along mode. The information may be obtained from the device itself, or from one or more servers connected to the device via the distributed network that store information pertinent to the device being diagnosed. In addition to the device-specific information, fleet-wide device data resident in population databases or servers may also be used in the diagnostic/prognostic analysis.

Furthermore, at any time during the diagnostic process, the device may be queried or controlled to obtain additional data from the device. Additionally, the extent of the diagnosis process can be limited, for example, based on a predefined user authorization scheme and corresponding user identification. Also, the results of the diagnostic/prognostic analysis and any repair procedures can be logged into a device service log or one or more databases that may be accessed via the distributed network.

For example, the systems and methods described in U.S. Provisional Application No. 60/145,016, incorporated herein by reference in its entirety, could be used to actually determine local systems faults in a particular electronic system. Additionally, the systems and methods described in copending U.S. patent application Ser. Nos. 09/450,177, 09/450,180, 09/450,181, 09/450,182, 09/450,183, 09/450,185, and 09/464,596, each incorporated herein by reference in its entirety, could also be used in conjunction with the systems and methods of this invention. However, it should be appreciated that, in general, any method of assembling information pertaining to the electronic system may be used with the systems and methods of this invention.

Further, the systems and methods described in the incorporated '596 application are particularly suitable for application in the systems and methods of the present invention or vice versa.

FIG. 1 illustrates a first exemplary embodiment of a diagnostic system 10 according to this invention. The diagnostic system 10 comprises an electronic system 100, such as a document processing system, in communication with a remote diagnostic system 300 via a distributed network 200. The distributed network 200, for example, may be an intranet, an extranet, a local area network, a metropolitan area network, a wide area network, a satellite communication network, an infrared communication network, the Internet, the World Wide Web, or any other known or later developed distributed network.

In the exemplary embodiment of FIG. 1, the electronic system 100 includes a controller 110, a memory 120, an input/output interface 130, one or more sensors 140, an analog-to-digital converter 150 and a preliminary analysis circuit or routine 160, all interconnected by a link 101. The link 101 can be wired or wireless links or any other known or later developed element or elements that are capable of supplying electronic data to and from the connected elements 110–150.

The input/output interface 130 may be any known or later developed mechanism, such as a server or client, that is capable of posting data from the electronic system 100 on the distributed network 200 and receiving data from the distributed network 200. Similarly, the sensors 140 may be any known or later developed mechanism or mechanisms that are capable of detecting data pertaining to the electronic system 100.

In the exemplary embodiment of FIG. 1, the remote diagnostic system 300 includes a controller 310, a memory 320, an input/output interface 330, a diagnostic device or routine 340, and a signature analysis device or routine 350, all interconnected by a link 301. The link 301 may be wired or wireless links or any other known or later developed element or elements that are capable of supplying electronic data to and from the connected elements 310–350.

Similarly, the input/output interface 330 may be any known or later developed mechanism, such as a server or client, that is capable of polling data from the distributed network 200 and sending information via the distributed network 200. Further, the diagnostic device 340 and the signature analysis device 350 may each be any known or later developed mechanism or mechanisms or software entity or entities that are capable of analyzing the data from the electronic system 100.

In operation, data pertaining to the electronic system 100 is collected by the controller 110 from one or more of the memory 120, the one or more sensors 140 and any other data sources providing the types of data described above and derived from the operational characteristics of the electronic system 100. The data is also processed by the controller 110 into a format recognizable by the preliminary analysis circuit or routine 160 and forwarded to the preliminary analysis circuit or routine 160. For example, the controller 110 may process the collected data by discretizing the analog data received from the one or more sensors 140 into qualitative values or by digitizing such analog data using the analog-to-digital converter 150. Alternatively, the controller 110 may process the collected data by translating device signals into discrete event sequences, as described in U.S. Provisional Application No. 60/154,016, incorporated herein by reference in its entirety, that can be recognized by the preliminary analysis circuit or routine 160.

The preliminary analysis circuit or routine 160 analyzes the data to determine an initial diagnosis. This can involve reasoning with the multiple sources of diagnostic/prognostic data and isolating the root of the cause for the failure, whether the failure be actual or impending. The preliminary analysis circuit or routine 160 can be based on one or more of the following diagnostic/prognostic technologies, for example, model-based diagnosis, discrete event systems diagnosis, bayesian networks, causal networks, neural networks, artificial intelligence, rule-based systems, expert systems, fuzzy logic analysis, and/or look-up tables or any other known or later developed diagnostic/prognostic technique. Based on the initial diagnosis, the preliminary analysis circuit or routine 160 determines if the electronic system 100 is operating satisfactorily or whether further analysis is required. Thus, the preliminary analysis circuit or routine 160 determines when data is to be transmitted to the remote diagnostic system 300 via the distributed network 200 and the links 201 and 202.

In various exemplary embodiments, once the preliminary analysis circuit or routine 160 determines that further analysis is required, the data is sent to the remote diagnostic system 300. This can involve posting the data on the distributed network 200 by the input/output interface 130 of the electronic system 100 and downloading the data by the input/output interface 330 of the remote diagnostic system 300.

In addition to the "push" mode described above, where data is sent to a central location for analysis based on local logic contained in the individual machines, a "pull" mode may be implemented. In the "pull" mode, the centralized systems requests signature samples for analysis from the field population. For example, this could be in response to a "hot" issue such as the discovery of a supplier problem or could be used as a way to improve the centralized knowledge base.

The remote diagnostic system 300 processes the data using the controller 310 and the memory 320 and analyzes the data using one or more of the diagnostic device or routine 340 and the signature analysis device or routine 350. In various embodiments, analysis by the remote diagnostic system 200 is based on at least one of a threshold analysis, a statistical analysis, a signature analysis, a trend analysis, a timing analysis, an event sequence analysis, a pattern analysis, an image processing technique, a quantitative state estimation technique and/or a qualitative state estimation technique, a model-based diagnostic technology, a look-up table, a-neural-network-based analysis, a fuzzy-logic-based analysis, a bayesian network, a causal network, a rule-based system analysis and/or an expert system, or any other known or later developed data analysis technique.

Based on the analysis of the data, the remote diagnostic system 300 sends a communication back to the electronic system or device 100 or to one or more third-party recipients. The communication may include one or more of repair information to a customer, a parts request to an appropriate entity, a service request notification to a customer service engineer and/or a revised set of operating instructions to the electronic system or device 100. Further, the communication can be sent via the distributed network 200. For example, the revised set of operating instructions can be sent by the input/output interface 330 to the distributed network 200 via the link 202. The input/output interface 130 then can download the revised set of operating instructions to the electronic system 100.

Additionally, it should be appreciated that this communication need not be limited to information sent via the distributed network 200, but can also include visual notifications, audio notifications or any other known or later developed technique usable to notify the appropriate party. Examples of such notification methods include notifications via e-mail, paging, cellular phones, a web page, or the like. Finally, the results of the diagnostic/prognostic analysis may also be stored in machine history logs and/or in one or more databases or servers.

Figure 2:
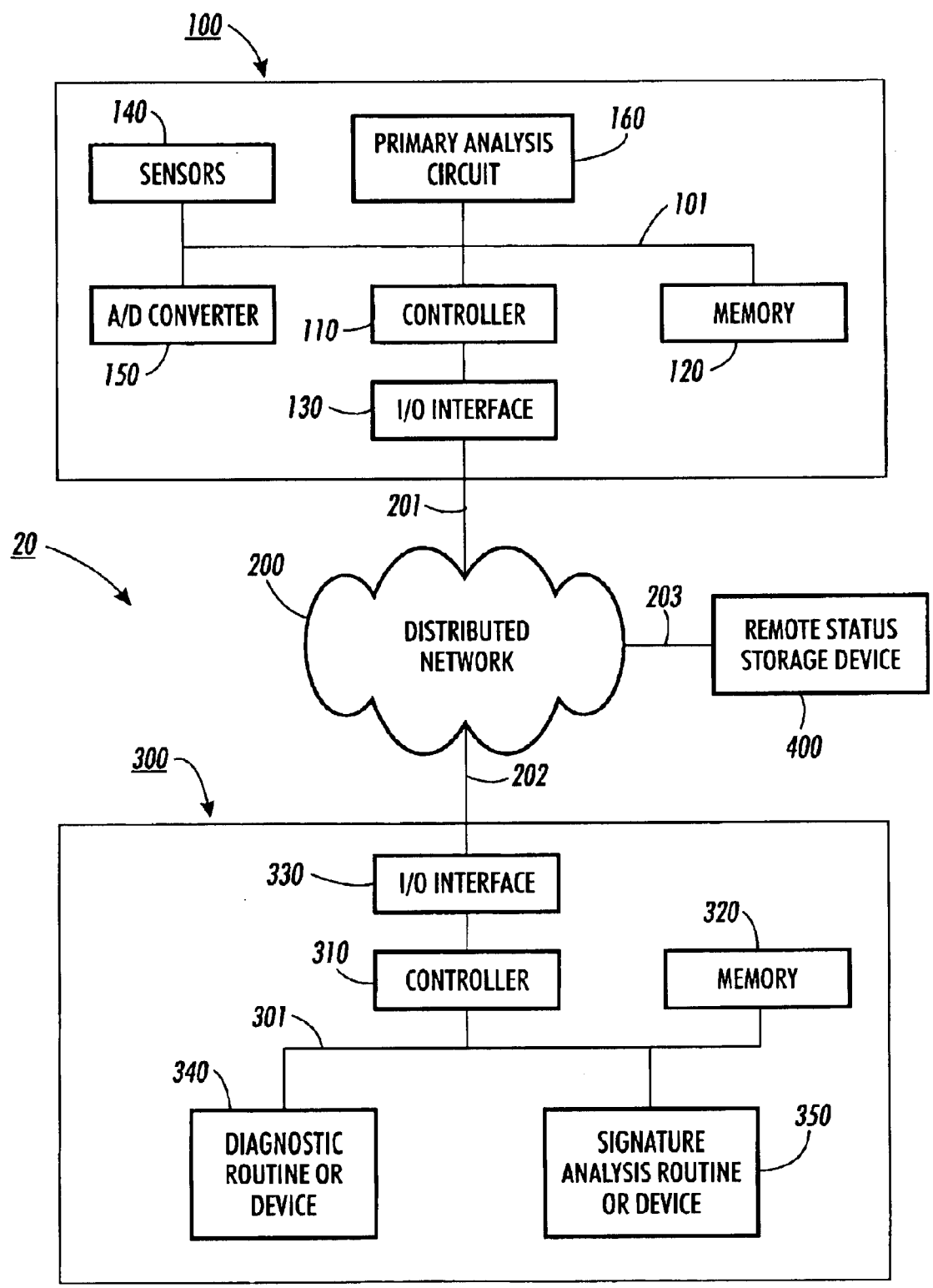
FIG. 2 is a functional block diagram illustrating a second exemplary embodiment of a diagnostic system according to this invention.

FIG. 2 illustrates a second exemplary embodiment of a diagnostic system 20 according to this invention. The diagnostic system 20 shown in FIG. 2 differs from the diagnostic system 10 shown in FIG. 1 in that a remote data storage device 400 is included in the diagnostic system 20. The remote data storage device 400 can include both individual device information of multiple devices and fleet-wide population statistics. Such information and statistics may be accessed via a link 203 and integrated by the electronic system 100 and/or the remote diagnostic system 300 when performing the diagnosis/prognosis.

Figure 3:
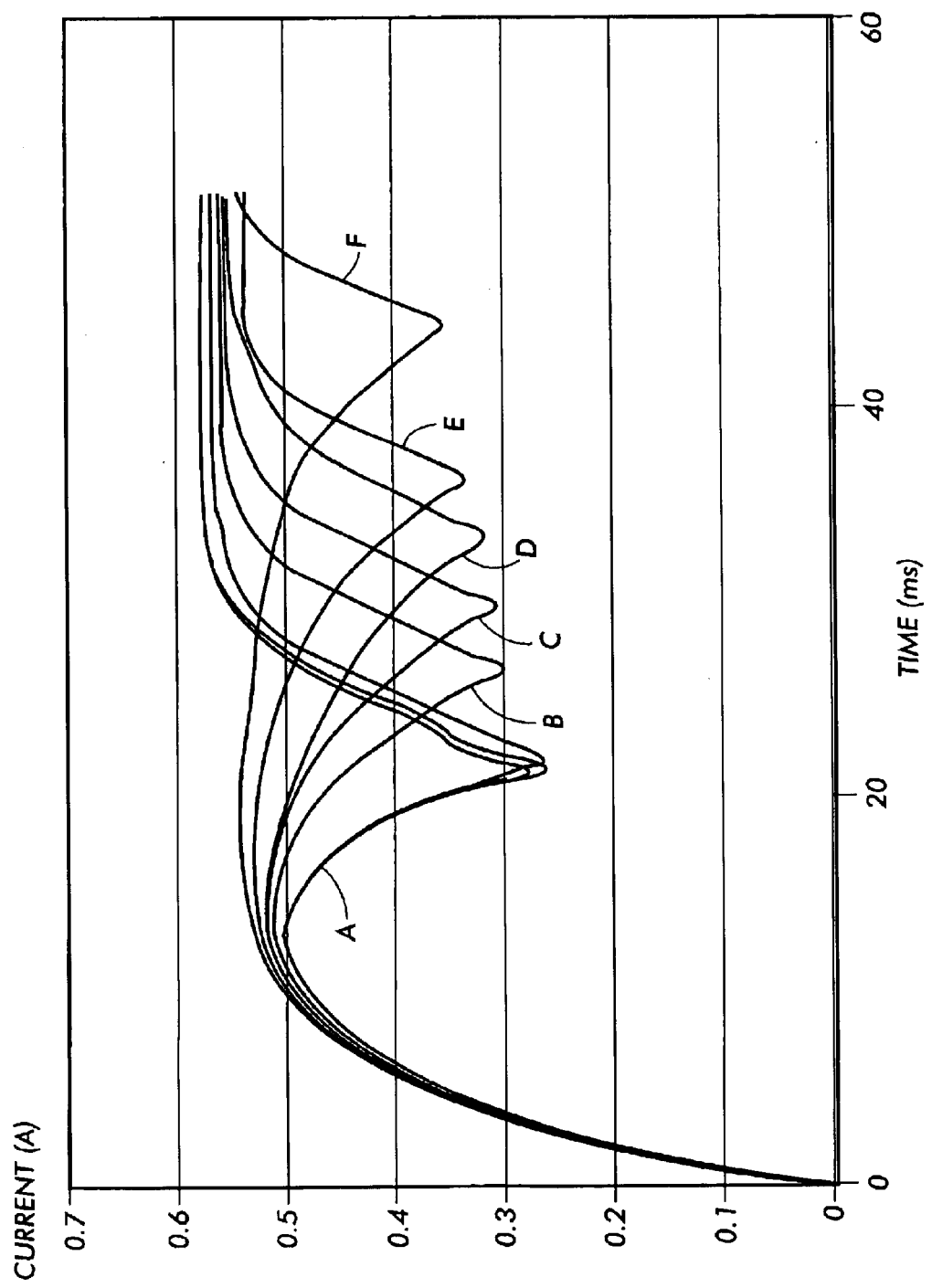
FIG. 3 is a chart illustrating a signature waveform of a solenoid as it ages.

In various exemplary embodiments of the systems and methods of this invention, signature analysis is used to provide advanced diagnosis and/or prognosis of the electronic system 100. Signature analysis techniques are particularly useful for diagnosis and/or prognosis since they are effective in detecting incipient failures and determining the stage of life of a component. As shown in FIG. 3, a signature waveform of a solenoid is charted to show its aging at 0–6 million cycles, lines A, at 8 million cycles, line B, at 10 million cycles, line C, at 12 million cycles, line D, at 14 million cycles, line E, and its eventual failure at 16 million cycles, line F. The waveform shifts gradually to the right and upward as the solenoid ages or wears. Signature analysis techniques may be applied to such a waveform in a known manner to determine failure of the solenoid and to predict when failure or out-of-specification operation is about to occur.

In addition, behavioral characteristics of solenoid-driven mechanisms may be identified through careful study of the signature waveform of the solenoid providing the motive force. Signature analysis may also provide the same kinds of information regarding other mechanisms, such as motors and clutches, as well as the mechanisms with which such other mechanisms cooperate. Additionally, signature analysis may be applied to other devices, including electro-optical devices such as LEDs, lamps and sensors. Degradation curves and remaining life characteristics have been developed for certain instances of these types of devices. Signature analysis techniques may also be applied to relatively complex subsystems, such as a paper path, where timing signatures based on discrete events form the basis of the analysis. Such a technique is described in U.S. Pat. No. 5,313,253 to Martin et al., which is incorporated herein by reference in its entirety.

Figure 4:
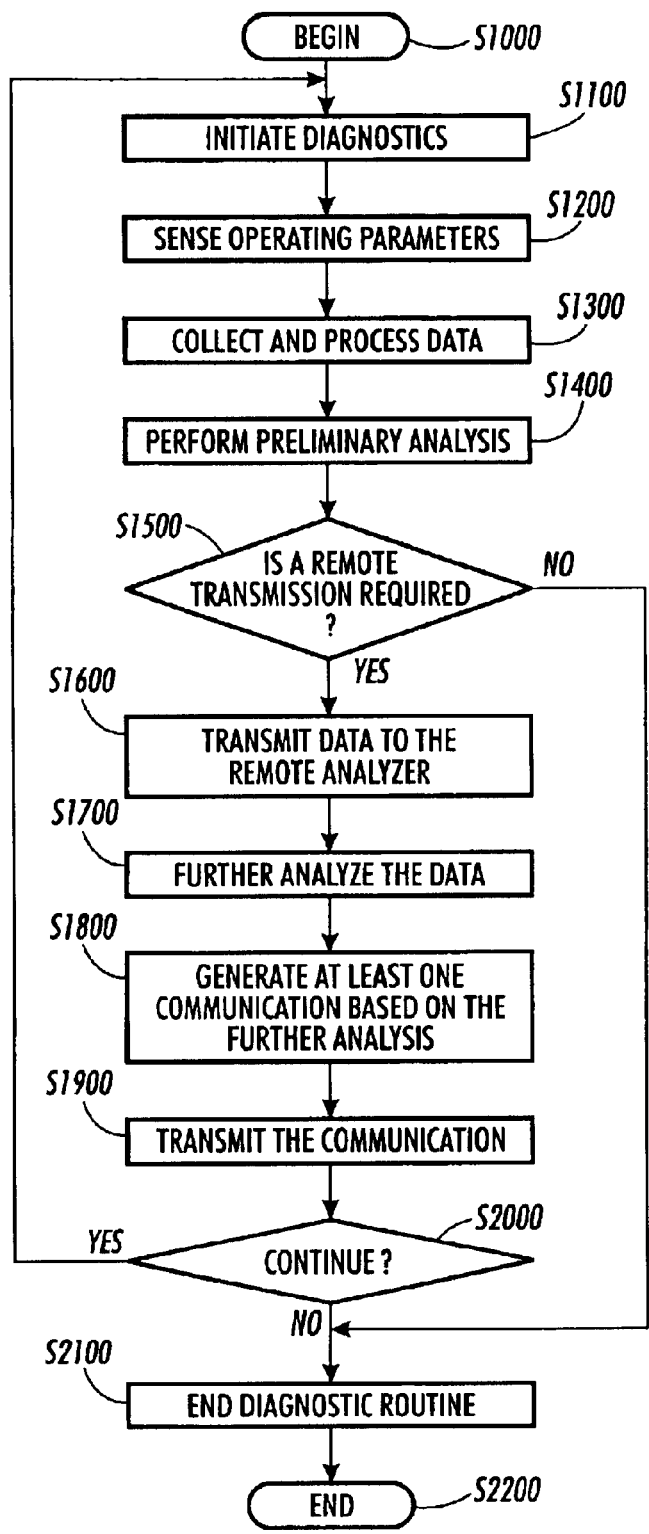
FIG. 4 is a flowchart outlining a first exemplary embodiment of a method according to this invention.

FIG. 4 is a flowchart outlining a first exemplary embodiment of a method according to this invention. Control begins in step S1000, and continues to step S1100 where the diagnostics/prognostics are initiated. Then, in step S1200, the operating parameters of the electronic system are sensed. Next, in step S1300, the sensed operating parameters are collected and processed as data. While collecting the data and sensing the operating parameters are shown in steps S1200 and S1300 subsequent to initiating the diagnostics in step S1100, it should be appreciated that the operating parameters can be sensed and the data can be collected and processed prior to or simultaneously with initiating the diagnostics. For example, the data may be collected and stored, and then accessed once the diagnostics are initiated.

In step S1400, a preliminary analysis of the data is performed. Next, in step S1500, based on this preliminary analysis, a determination is made whether a remote transmission is required. For example, if the preliminary analysis of the data indicates that the electronic system or a component of the electronic system is operating improperly or abnormally, further analysis can be sought. In such a case, control proceeds to step S1600, where the data is transmitted to the remote analyzer, for example, over the distributed network. Control then continues to step S1700 where the data is analyzed further.

Next, in step S1800, at least one communication is generated based on the further analysis of step S1700. In step S1900, the at least one communication is transmitted to an appropriate entity. Then, in step S2000, as described in more detail below, control may continue by re-initiating the diagnostics in step S1100. Otherwise, control proceeds to step S2100 where the diagnostic routine ends. Similarly, if a remote transmission for further analysis is not needed as determined in step S1500, control jumps directly to step S2100. Then, in step S2200, the control routine ends.

Figure 5:
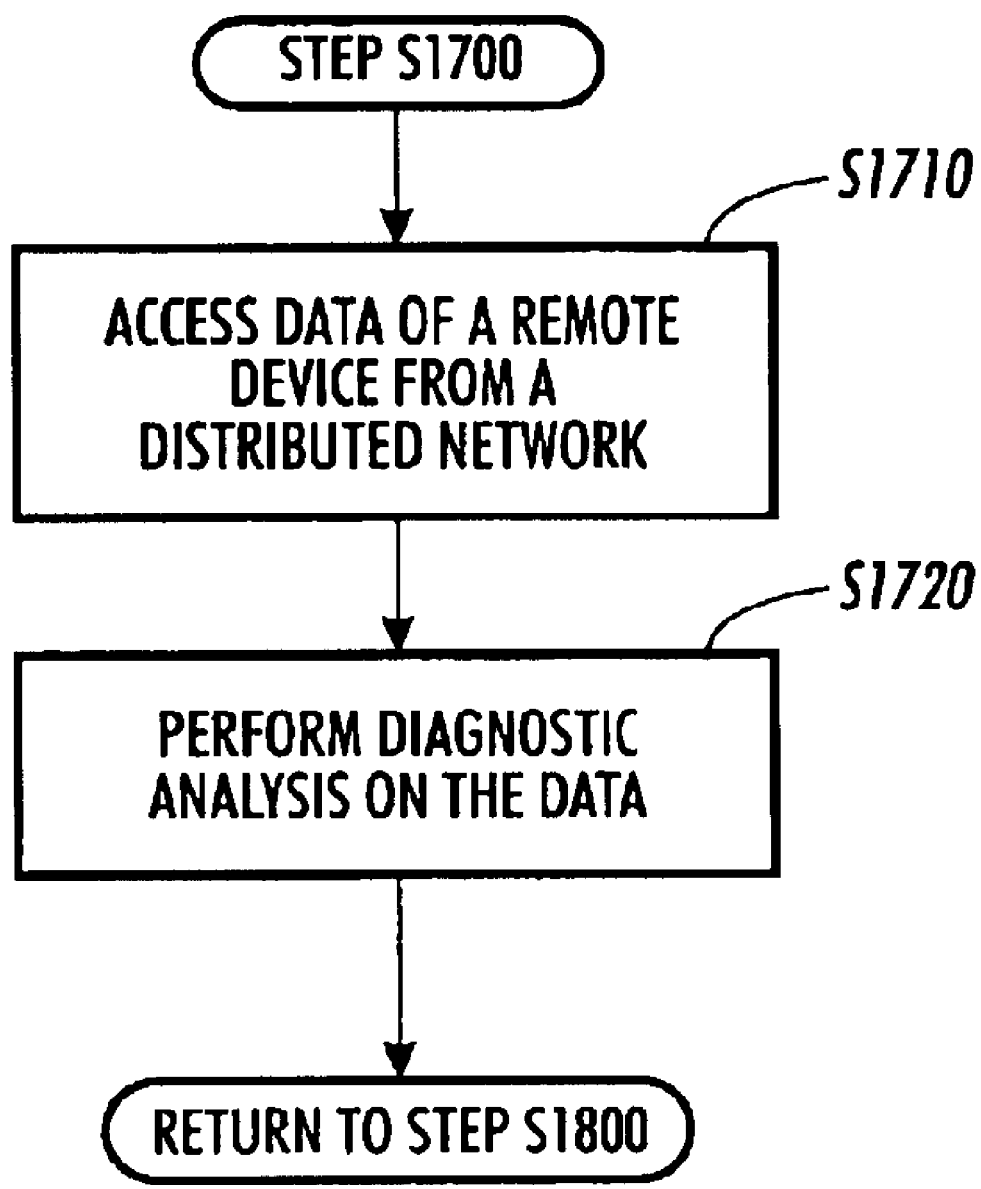
FIG. 5 is a flowchart outlining in more detail an exemplary embodiment of the further analysis step of the exemplary embodiment of FIG. 4.

FIG. 5 is a flowchart outlining an exemplary embodiment of the further analysis of step S1700 shown in FIG. 4. In step S1710, transmitted data of a remote device is received. For example, data may be accessed from a distributed network once data from one or more electronic systems have posted data on the distributed network. Then, in step S1720, diagnostic analysis comprising the further analysis is performed. Control then returns to step S1800.

Figure 6:
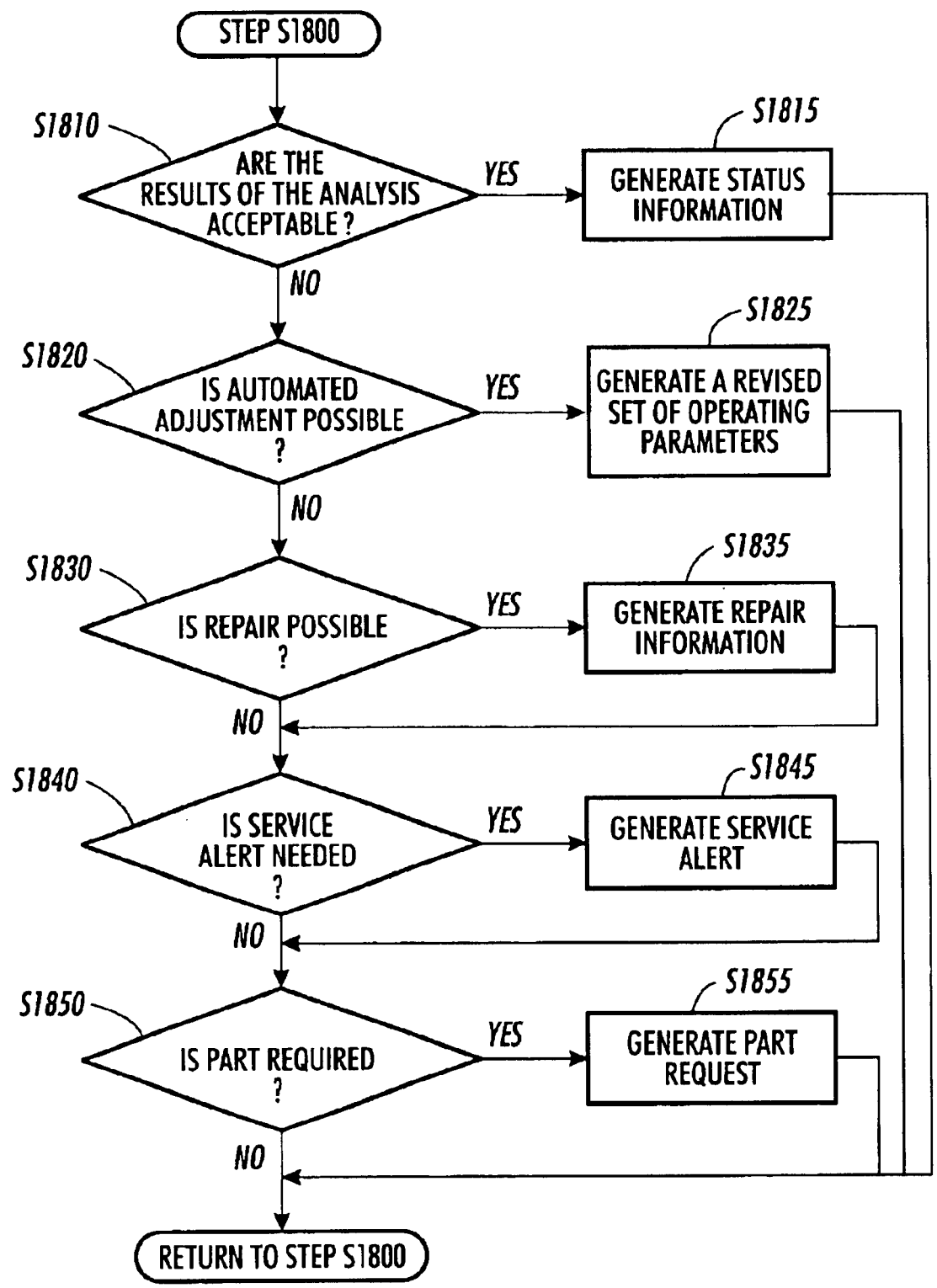
FIG. 6 is a flowchart outlining in more detail an exemplary embodiment of the communication generating step of the exemplary embodiment of FIG. 4.

FIG. 6 is a flowchart outlining an exemplary embodiment of the communication generating step S1800 shown in FIG. 4. In step S1800, the results of the diagnostic analysis of step S1720 are evaluated. It should be understood that the particular evaluation steps shown in FIG. 6 are exemplary only and that one or more of the steps may not be included, or other steps may be added in accordance with the invention. Also, the evaluating steps S1810–S1850 may be performed to take into account the results of one or more of the other evaluating steps in addition to the results of the diagnostic analysis of step S1720.

In step S1810, a determination is made whether the results of the diagnostic analysis of step S1720 are acceptable. Thus, if the diagnostic analysis indicates that the electronic system is operating satisfactorily, the method proceeds to step S1815, where a communication comprising status information is generated. While the initial diagnosis of the electronic system from the preliminary analysis in step S1400 may indicate that a problem or potential problem exists, the diagnostic analysis performed in step S1720 may indicate that the overall operation of the electronic system is satisfactory and no remediation is needed. For example, even though one or more individual sub-systems or components of the electronic system may be operating abnormally, the diagnostic analysis performed in step S1720 may determine that the individual sub-systems or components counter-balance each other so that the overall performance of the electronic system is satisfactory. Accordingly, control proceeds from step S1815 to step S1900. Even if the overall performance of the electronic system is satisfactory, control may proceed to any of steps S1820, S1830, S1840 and/or S1820 as appropriate for the abnormal operation of the individual sub-systems or components, for example, to schedule future repairs.

The status information generated in step S1815 may be, for example, one or more of a date record of the analysis, a summary of the analysis, an "okay" indication and other relevant information. It should be understood that, while the creation of status information is shown in FIG. 6 as a separate step only after the results of the analysis are determined to be acceptable in step S1810, additional status information generation steps may be included to generate status information that includes information related to the other evaluation steps S1820–S1850. For example, the status information may include information regarding revisions to operating parameters.

If the results are determined to be unacceptable in step S1810, then control proceeds to step S1820, where a determination is made whether automated adjustment of the remote electronic system or device is possible. If automated adjustment of the remote device is possible, then a revised set of operating parameters or instructions is generated in step S1825. Control then jumps to step S1900.

If automated adjustment of the remote device is not possible, then control proceeds to step S1830 where a determination is made whether manual repair is possible. For example, the determination made in step S1830 may be whether a needed repair of the remote device may be readily accomplished by the customer. As an alternative example, the determination made in step S1830 may be whether a needed repair of the remote device may be accomplished by a customer service engineer. In any case, if manual repair is possible, then repair information is generated in step S1835. Control then proceeds to step S1840. If manual repair is not possible, then control jumps directly to step S1840.

In step S1840, a determination made whether a service alert is needed. If needed, a service alert is generated in step S1845. For example, if a needed repair of the remote device cannot or should not be undertaken by a customer, the service alert may be generated to inform a customer service engineer or other appropriate entity that the particular electronic system is in need of service and/or the nature of the problem or potential problem. Further, even if immediate repair or service is not needed, the service alert generated in step S1845 may provide information to a customer service engineer or other appropriate entity for scheduling service and/or regular maintenance. After the service alert is generated, control proceeds to step S1850. If, on the other hand, a service alert is not needed, then control jumps directly to step S1850.

In step S1850, a determination made whether a part or parts are needed. For example, a part may be required to carry out the repair according to the repair information generated in step S1835. Also, a part may be nearing the end of its useful life and require replacement. Thus, if one or more parts are needed, then a parts request is generated in step S1855. Such a parts request may accompany the repair information or the service alert, or may, for example, separately schedule delivery of a needed part to the location of the remote device. After the parts request is generated, control proceeds to step S1900. If a parts request is not needed, then control jumps directly to step S1900.

Figure 7:
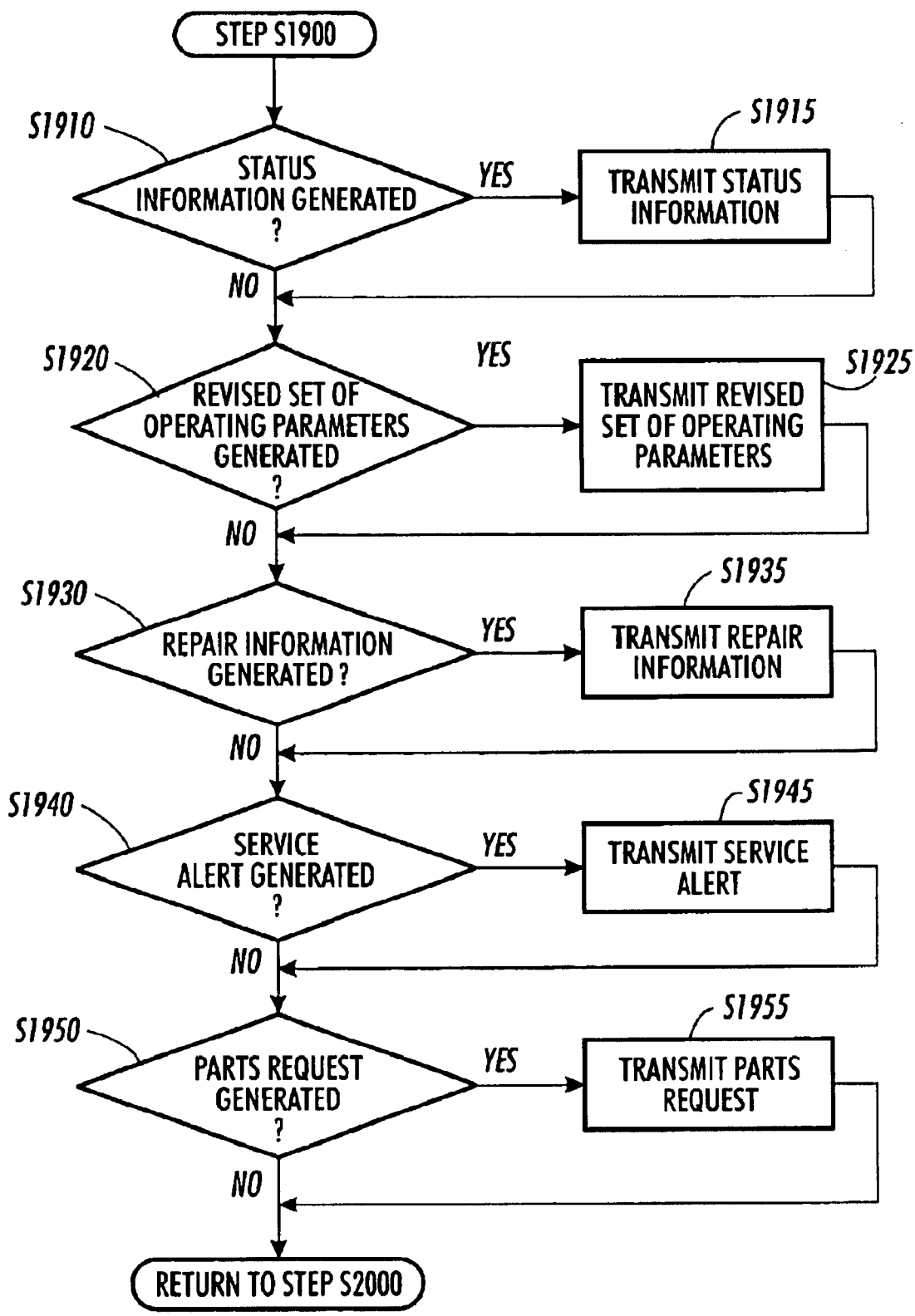
FIG. 7 is a flowchart outlining in more detail an exemplary embodiment of the communication transmitting step of the exemplary embodiment of FIG. 4.

FIG. 7 is a flowchart outlining an exemplary embodiment of the communication transmitting step S1900 shown in FIG. 4. In step S1910, an inquiry is made whether status information has been generated. If so, then control proceeds to step S1915 where the status information is transmitted. The status information may be transmitted to any desired receiver, such as the remote device, a knowledge database, a monitoring station or any other known or hereafter developed device capable of using such status information.

Control then proceeds to step S1920. Control proceeds directly to step S1920 if no status information has been generated. In step S1920, an inquiry is made whether a revised set of operating parameters or instructions has been generated. If so, then control proceeds to step S1925 where the revised set of operating parameters is transmitted to the remote device.

Control then proceeds to step S1930. Control proceeds directly to step S1930 if a revised set of operating parameters has not been generated. In step S1930, an inquiry is made whether repair information has been generated. If so, then control proceeds to step S1935 where the repair information is transmitted to a third party, for example, a customer and/or a customer service engineer.

Control then proceeds to step S1940. Control proceeds directly to step S1940 if no repair information has been generated. In step S1940, an inquiry is made whether a service alert has been generated. If so, then control proceeds to step S1945 where the service alert is transmitted to a third party, for example, a customer service engineer. As noted below, the service alert may be combined with the repair information, such as repair instructions for the customer service engineer.

Control then proceeds to step S1950. Control proceeds directly to step S1950 if no service alert has been generated. In step S1950, an inquiry is made whether a parts request has been generated. If so, then control proceeds to step S1955 where the parts request is transmitted to a third party, for example, a parts supplier and/or a customer service engineer.

Control then returns to step S2000. Control proceeds directly to step S2000 if no parts request has been generated.

It should be understood that, while individual transmitting steps are shown sequentially in FIG. 7, the status information, the revised set of operating parameters, the repair information, the service alert and the parts request may be executed simultaneously and may be transmitted in combination as appropriate. For example, the repair information and the service alert may be combined and sent together to a customer service engineer.

Returning briefly to FIG. 4, in step S2000, a determination is made whether to continue with the diagnostics. For example, if a revised set of operating instructions is transmitted to the remote device, then re-initiation of the diagnostics in step S1100 may be used to verify that the remote device is operating within specifications when operating according to the revised parameters. Similarly, returning control to step S1100 may be used to verify that a needed repair has been completed if repair information was transmitted. Alternatively, independent verification of the remote device's operation with the revised parameters and/or the completion of a needed repair may be used. Thus, control then continues directly to step S2100 where the diagnostic routine ends.

Figure 8:
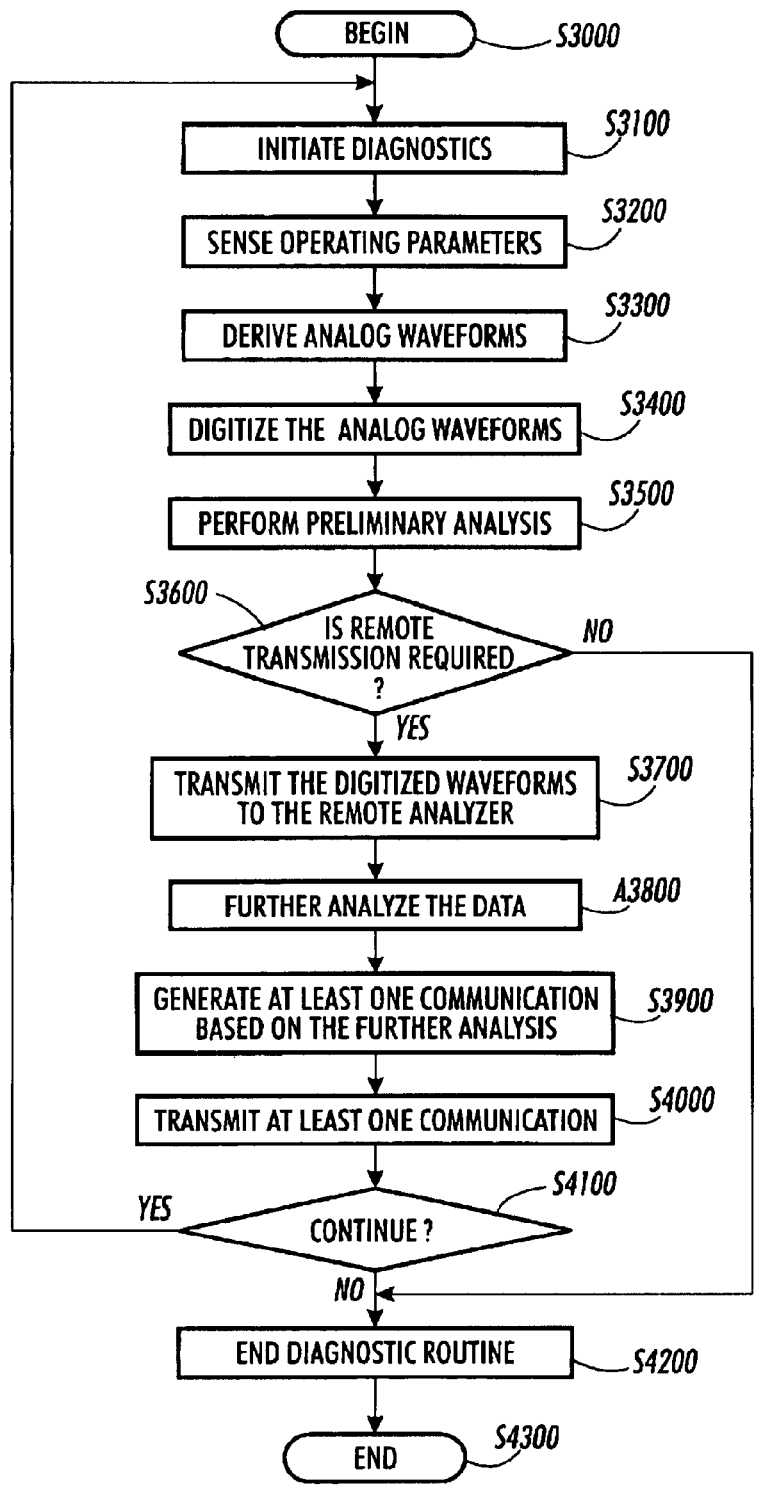
FIG. 8 is a flowchart outlining a second exemplary embodiment of a method according to this invention.

FIG. 8 is a flowchart outlining a second exemplary embodiment of method according to this invention. Control begins in step S3000 and continues to step S3100 where the diagnostics/prognostics are initiated. Then, in step S3200, the operating parameters of the electronic system are sensed, e.g., detected by analog sensors. Next, in step S3300, analog waveforms are obtained from the sensed operating parameters. While sensing the operating parameters and obtaining the analog waveforms are shown in steps S3200 and S3300 subsequent to initiating the diagnostics in step S3100, it should be appreciated that the operating parameters can be sensed and the analog waveforms can be derived prior to or simultaneously with initiating the diagnostics as well. For example, the parameters may be collected and stored and the analog waveforms can be derived and stored, and then accessed once the diagnostics are initiated.

In step S3400, the analog waveforms are digitized. Then, in step S3500, a preliminary analysis of the digitized waveforms is performed. Next, in step S3600, based on this preliminary analysis, a determination is made whether a remote transmission is required. For example, if the preliminary analysis of the waveforms indicates that the electronic system or a component thereof is operating improperly or abnormally, further analysis can be sought. In such a case, the method proceeds to step S3700 in which the waveforms are transmitted to the remote analyzer, for example, over the distributed network. Control then continues to step S3800 where the data is analyzed further.

While the waveforms are digitized in step S3400 prior to the preliminary analysis in step S3500 and the determination in step S3600, it should be understood that the waveforms can be digitized after it is determined that a remote transmission is required in step S3600. Digitizing the waveforms facilitates transmission and therefore may not be necessary unless a remote transmission is required.

Next, in step S3900, at least one communication is generated based on the further analysis of step S3800. In step S4000, the at least one communication is transmitted to an appropriate entity. Then, in step S4100, as described in more detail below, control may continue by re-initiating the diagnostics in step S3100. Otherwise, control proceeds to step S4200 where the diagnostic routine ends. Similarly, if a remote transmission for further analysis is not needed as determined in step S3600, control jumps directly to step S4200. Then, in step S4300, the control routine ends.

Figure 9:
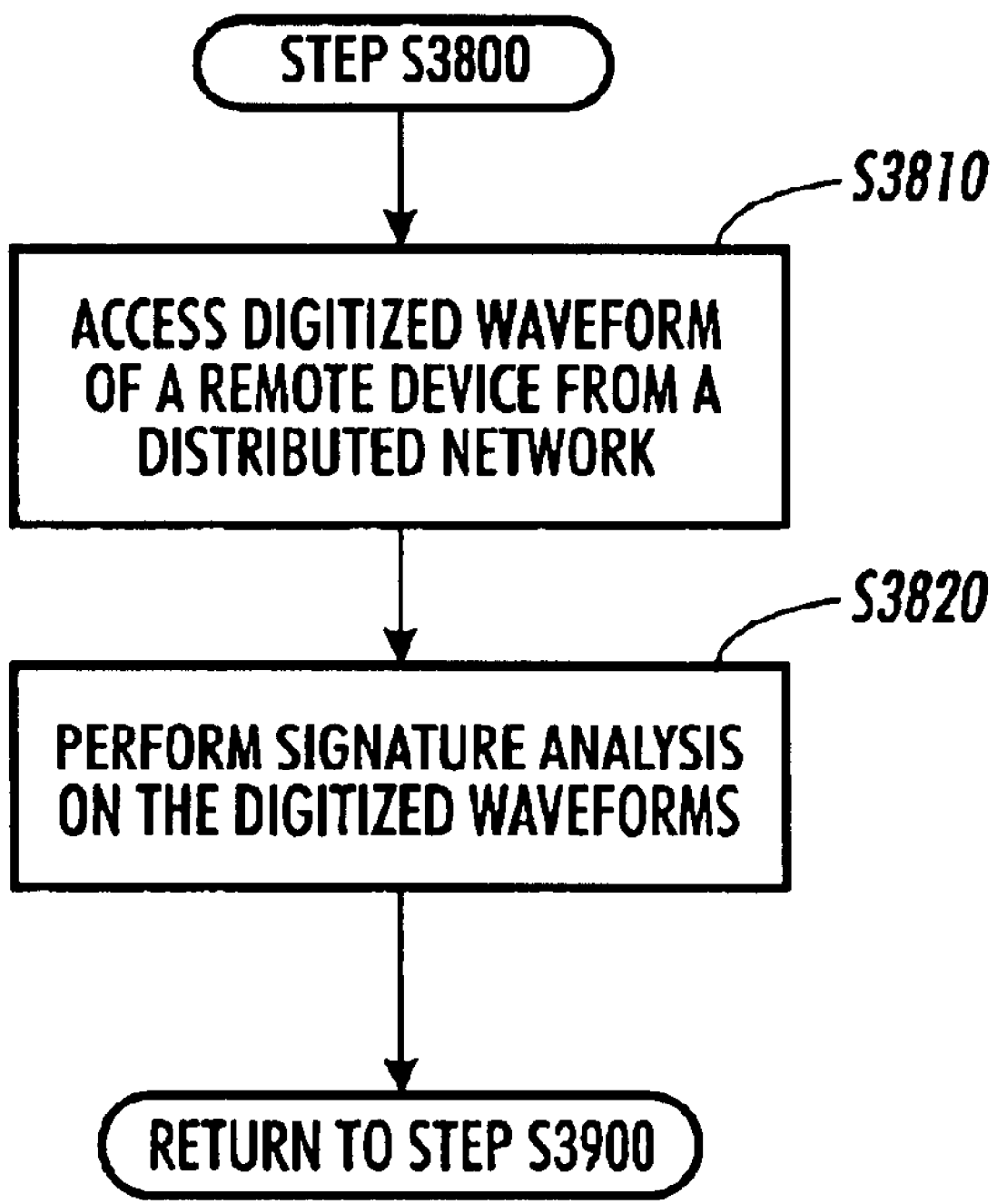
FIG. 9 is a flowchart outlining in more detail an exemplary embodiment of the further analysis step of the exemplary embodiment of FIG. 8.

FIG. 9 is a flowchart outlining an exemplary embodiment of the further analysis of step S3800 shown in FIG. 8. In step S3810, digitized waveforms of a remote device are received. For example, the digitized waveforms may be accessed from a distributed network once waveforms from one or more electronic systems have posted data on the distributed network. Then, in step S3820, signature analysis comprising the further analysis is performed. Control then returns to step S3900.

Figure 10:
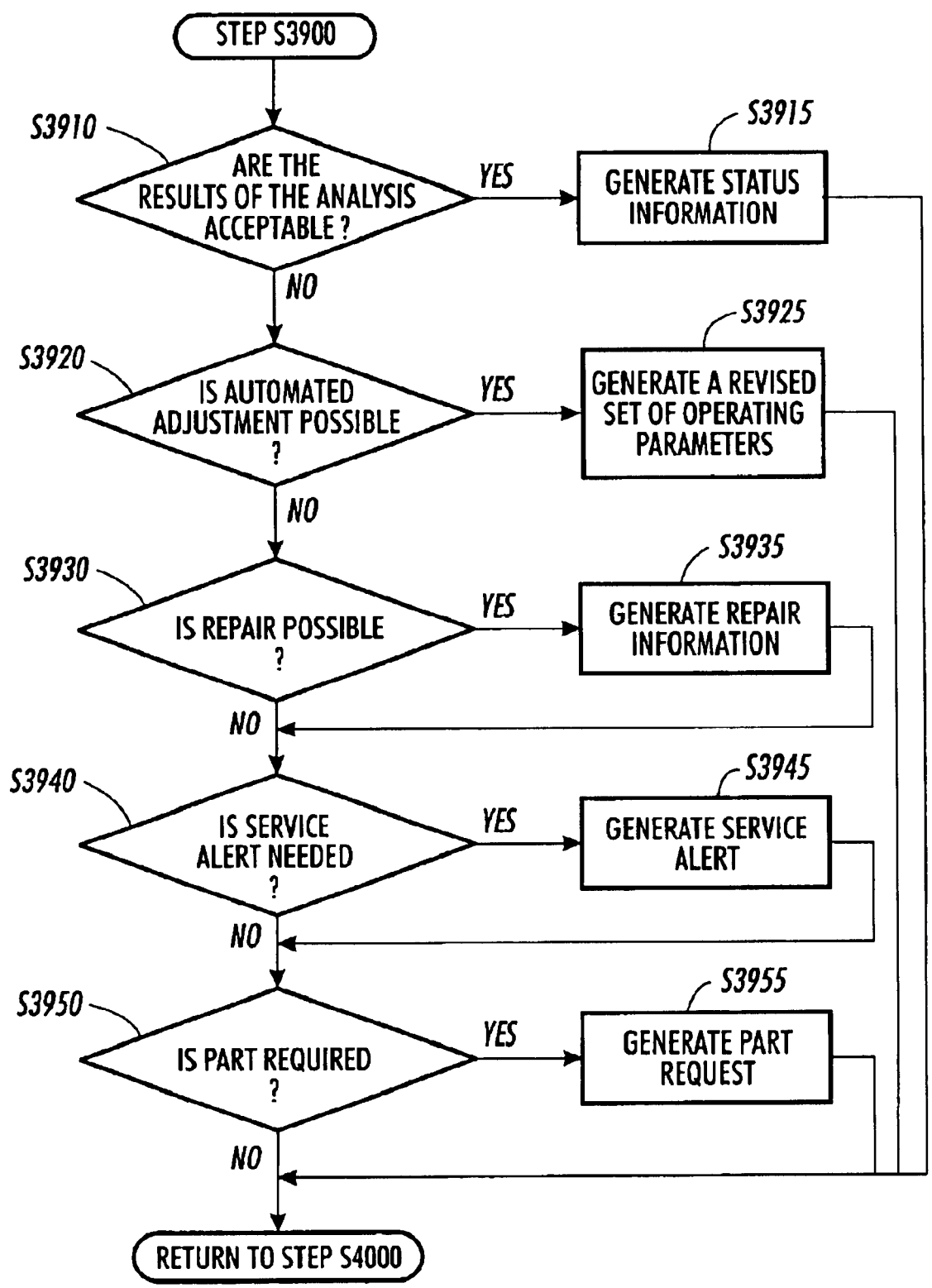
FIG. 10 is a flowchart outlining in more detail an exemplary embodiment of the communication generating step of the exemplary embodiment of FIG. 8.

FIG. 10 is a flowchart outlining an exemplary embodiment of the communication generating step S3900 shown in FIG. 8. In step S3900, the results of the signature analysis of step S3820 are evaluated. It should be understood that the particular evaluation steps shown in FIG. 10 are exemplary only and that one or more of the steps may not be included, or other steps may be added in accordance with the invention. Also, the evaluating steps S3910–S3950 may be performed to take into account the results of one or more of the other evaluating steps in addition to the results of the signature analysis of step S3820.

In step S3910, a determination is made whether the results of the signature analysis of step S3820 are acceptable. Thus, if the signature analysis indicates that the electronic system is operating satisfactorily, the method proceeds to step S3915, where a communication comprising status information is generated. While the initial diagnosis of the electronic system from the preliminary analysis in step S3500 may indicate that a problem or potential problem exists, the signature analysis performed in step S3820 may indicate that the overall operation of the electronic system is satisfactory and no remediation is needed. For example, even though one or more individual sub-systems or components of the electronic system may be operating abnormally, the signature analysis performed in step S3820 may determine that the individual sub-systems or components counter-balance each other so that the overall performance of the electronic system is satisfactory. Accordingly, control proceeds from step S3915 to step S4000.

The status information may be, for example, one or more of a date record of the analysis, a summary of the analysis, an "okay" indication and other relevant information. It should be understood that, while the creation of status information is shown in FIG. 10 as a separate step only after the results of the analysis are determined to be acceptable in step S3910, additional status information generation steps may be included to generate status information that includes information related to the other evaluation steps S3920–S3950. For example, the status information may include information regarding revisions to operating parameters.

If the results are determined to be unacceptable in step S3910, then control proceeds to step S3920, where a determination is made whether automated adjustment of the remote electronic system or device is possible. If automated adjustment of the remote device is possible, then a revised set of operating parameters or instructions is generated in step S3925. Control then jumps to step S4000.

If automated adjustment of the remote device is not possible, then control proceeds to step S3930 where a determination is made whether manual repair is possible. For example, the determination made in step S3930 may be whether a needed repair of the remote device may be readily accomplished by the customer. As an alternative example, the determination made in step S3930 may be whether a needed repair of the remote device may be accomplished by a customer service engineer. In any case, if manual repair is possible, then repair information is generated in step S3935. Control then proceeds to step S3940. If manual repair is not possible, then control jumps directly to step S3940.

In step S3940, a determination is made whether a service alert is needed. If needed, a service alert is generated in step S3945. For example, if a needed repair of the remote device cannot or should not be undertaken by a customer, the service alert may be generated to inform a customer service engineer or other appropriate entity that the particular electronic system is in need of service and/or the nature of the problem or potential problem. Further, even if immediate repair or service is not needed, the service alert generated in step S3945 may provide information to a customer service engineer or other appropriate entity for scheduling service and/or regular maintenance. After the service alert is generated, control proceeds to step S3950. If, on the other hand, a service alert is not needed, then control jumps directly to step S3950.

In step S3950, a determination made whether a part or parts are needed. For example, a part may be required to carry out the repair according to the repair information generated in step S3935. Also, a part may be nearing the end of its useful life and require replacement. Thus, if one or more parts are needed, then a parts request is generated in step S3955. Such a parts request may accompany the repair information or the service alert, or may, for example, separately schedule delivery of a needed part to the location of the remote device. After the parts request is generated, control proceeds to step S4000. If a parts request is not needed, then control jumps directly to step S4000.

Figure 11:
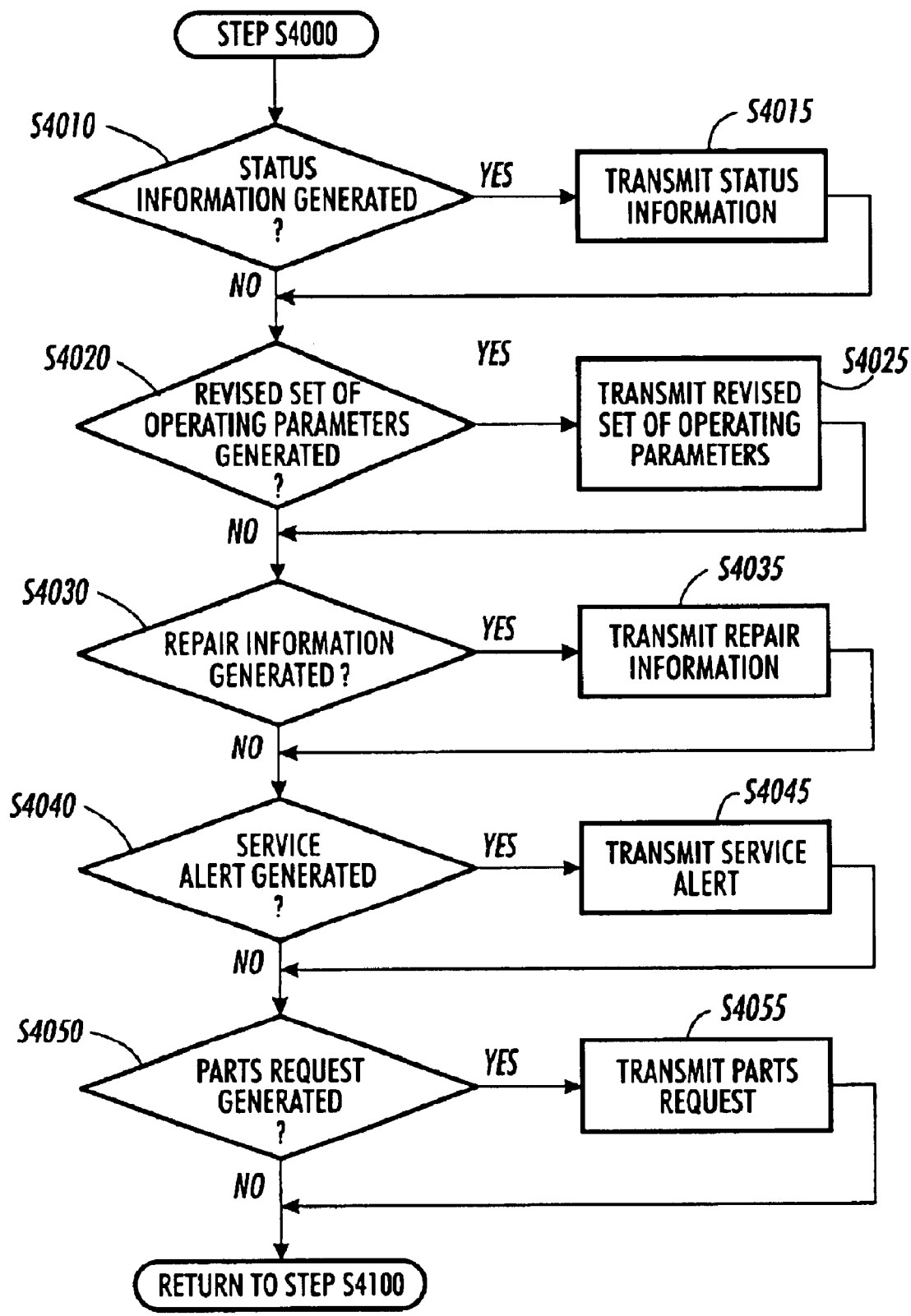
FIG. 11 is a flowchart outlining in more detail an exemplary embodiment of the communication transmitting step of the exemplary embodiment of FIG. 8.

FIG. 11 is a flowchart outlining an exemplary embodiment of the communication transmitting step S4000 shown in FIG. 8. In step S4010, an inquiry is made whether status information has been generated. If so, then control proceeds to step S4015 where the status information is transmitted. The status information may be transmitted to any desired receiver, such as the remote device, a knowledge database, a monitoring station or any other known or hereafter developed device capable of using such status information.

Control then proceeds to step S4020. Control proceeds directly to step S4020 if no status information has been generated. In step S4020, an inquiry is made whether a revised set of operating parameters or instructions has been generated. If so, then control proceeds to step S4025 where the revised set of operating parameters is transmitted to the remote device.

Control then proceeds to step S4030. Control proceeds directly to step S4030 if a revised set of operating parameters has not been generated. In step S4030, an inquiry is made whether repair information has been generated. If so, then control proceeds to step S4035 where the repair information is transmitted to a third party, for example, a customer and/or a customer service engineer.

Control then proceeds to step S4040. Control proceeds directly to step S4040 if no repair information has been generated. In step S4040, an inquiry is made whether a service alert has been generated. If so, then control proceeds to step S4045 where the service alert is transmitted to a third party, for example, a customer service engineer. As noted below, the service alert may be combined with the repair information, such as repair instructions for the customer service engineer.

Control then proceeds to step S4050. Control proceeds directly to step S4050 if no service alert has been generated. In step S4050, an inquiry is made whether a parts request has been generated. If so, then control proceeds to step S4055 where the parts request is transmitted to a third party, for example, a parts supplier and/or a customer service engineer.

Control then returns to step S4100. Control proceeds directly to step S4100 if no parts request has been generated.

It should be understood that, while individual transmitting steps are shown sequentially in FIG. 11, the status information, the revised set of operating parameters, the repair information, the service alert and the parts request may be executed simultaneously and may be transmitted in combination as appropriate. For example, the repair information and the service alert may be combined and sent together to a customer service engineer.

Returning briefly to FIG. 8, in step S4100, a determination is made whether to continue with the diagnostics. For example, if a revised set of operating instructions is transmitted to the remote device, then re-initiation of the diagnostics in step S3100 may be used to verify that the remote device is operating within specifications when operating according to the revised parameters. Similarly, returning control to step S3100 may be used to verify that a needed repair has been completed if repair information was transmitted. Alternatively, independent verification of the remote device's operation with the revised parameters and/or the completion of a needed repair may be used. Thus, control then continues directly to step S4200 where the diagnostic routine ends.

Although not shown, it should be understood that a new set of revised operating parameters may be generated if the electronic system is not operating within specifications. Alternatively, the method may proceed as the case when automated adjustment of the remote electronic system is not possible once a number of revised sets have been attempted.

As shown in FIGS. 1 and 2, the diagnostic systems 10 and 20 of the invention is preferably implemented either on a single program general purpose computer or separate program general purpose computers. However, the diagnostic systems 10 and 20 can also be implemented on special purpose computers, programmed microprocessors or microcontrollers and peripheral integrated circuit elements, ASICs, or other integrated circuits, digital signal processors, hard-wired electronic or logic circuits such as a discreet element circuits, programmable logic devices such as a PLD, PLA, FPGA, PAL, or the like. In general, any device capable of implementing a finite state machine that is in turn capable of implementing the a flowcharts shown in FIGS. 4–11 can be used to implement the diagnostic systems 10 and 20.

Furthermore, the methods shown in FIGS. 4–11 may be readily implemented in software using object or object-oriented software development environments that provide portable source code that can be used on a variety of computer, workstation and/or personal digital assistant hardware platforms. Alternatively, the disclosed diagnostic systems 10 and 20 may be implemented partially or fully in a hardware using standard logic circuits or a VLSI design. Whether software or hardware is used to implement the systems and methods in accordance with this invention is dependent on the speed and/or efficiency requirements of the system, the particular function, and the particular software or hardware systems or microprocessor or microcomputer systems being utilized. The diagnostic systems and methods described above, however, can also be readily implemented in hardware or software using any known or later-developed systems or structures, devices and/or software by those skilled in the applicable art without undue experimentation from the functional description provided above together with a general knowledge of the computer arts.

Moreover, the methods illustrated in FIGS. 4–11 may be readily implemented as software executed on a programmed general purpose computer, a special purpose computer, a microprocessor, or the like. In this case, the methods and systems of this invention can be implemented as a routine embedded on a personal computer, such as a Java® or CGI script, as a resource residing on a server or graphics workstation, as a routine embedded in a diagnostic system, personal digital assistant interface, dedicated hand-held device, or the like. The diagnostic systems and methods according to this invention can also be implemented by physically incorporating the systems and/or methods into a software and/or a hardware system, such as the hardware and software systems of a workstation or dedicated diagnostic system.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention.

What is claimed is:

1. A diagnostic system for automated diagnosis or prognosis of at least one electronic system, comprising:
    a data acquisition and processing circuit that collects and processes data;
    a diagnostic circuit that analyzes the data from the data acquisition and processing circuit to obtain an initial diagnosis;
    a data transmission circuit that sends the data over a distributed network to a remote diagnostic system based on the initial diagnosis; and
    a remote diagnostic system that analyzes the data from the data transmission circuit and sends a communication based on the analysis of the data,
    wherein the communication sent by the remote diagnostic system includes at least one of repair information to a third party, a parts request to a third party, a service request notification to a third party and a revised set of operating instructions to the at least one electronic system based on the analysis of the data by the remote diagnostic system, the revised set of operating instructions at least one of correcting a failure and preventing a failure of the at least one electronic system.

2. The system of claim 1, wherein the diagnostic circuit analyzes the data based on at least one of a threshold analysis, a statistical analysis, a signature analysis, a trend analysis, a timing analysis, an event sequence analysis, a pattern analysis, an image processing technique, a quantitative state estimation technique, a qualitative state estimation technique, a model-based diagnostic technology, a look-up table, a neural-network-based analysis, a fuzzy-logic-based analysis, a bayesian network, a causal network, a rule-based system analysis and an expert system.

3. The system of claim 1, wherein the communication sent by the remote diagnostic system is transmitted to the at least one electronic system over the distributed network.

4. A diagnostic system for automated diagnosis or prognosis of at least one electronic system, comprising:
    a data acquisition and processing circuit that collects and processes data;
    a diagnostic circuit that analyzes the data from the data acquisition and processing circuit to obtain an initial diagnosis; and
    a data transmission circuit that sends the data over a distributed network to a remote diagnostic system based on the initial diagnosis, wherein:
    the data acquisition and processing circuit detects a signature waveform of a part of the at least one electronic system and comprises an analog-to-digital converter that digitizes the signature waveform; and
    the data transmission circuit sends the digitized waveform via the distributed network to the remote diagnostic system based on the initial diagnosis, the remote diagnostic system analyzes the digitized waveform from the data transmission circuit and sends a communication including a revised set of operating instructions based on the analysis of the digitized waveform.

5. The system of claim 4, wherein the remote diagnostic system analyzes the data based on at least one of a threshold analysis, a statistical analysis, a signature analysis, a trend analysis, a timing analysis, an event sequence analysis, a pattern analysis, an image processing technique, a quantitative state estimation technique, a qualitative state estimation technique, a model-based diagnostic technology, a look-up table, a neural-network-based analysis, a fuzzy-logic-based analysis, a bayesian network, a causal network, a rule-based system analysis and an expert system.

6. The system of claim 4, wherein the remote diagnostic system analysis is based on a signature analysis.

7. A diagnostic system for automated diagnosis or prognosis of at least one electronic system, comprising:

at least one sensor that detects a signature waveform of a part of the at least one electronic system;

a signature analysis circuit that analyzes the signature waveform to diagnose at least one characteristic of the part of the at least one electronic system;

an analog-to-digital converter that digitizes the signature waveform;

a remote diagnostic system that includes the signature analysis circuit; and a transmission circuit that sends the digitized waveform via a distributed network to the remote diagnostic system, wherein the remote diagnostic system sends a communication including a revised set of operating instructions based on the analysis of the digitized waveform.

8. The system of claim 7, wherein the communication sent by the remote diagnostic system comprises repair information to a third party.

9. The method of claim 7, wherein the communication sent by the remote diagnostic system comprises a parts request.

10. The method of claim 7, wherein the communication sent by the remote diagnostic system comprises a service request notification.

11. The system of claim 7, wherein the communication sent by the remote diagnostic system is over the distributed network.

12. A method for diagnosing or predicting failures in at least one electronic system, comprising:

obtaining data pertaining to the at least one electronic system;

analyzing the data to obtain an initial diagnosis;

selectively transmitting the data to a remote diagnostic system based on the initial diagnosis;

remotely analyzing the data; and sending a communication from the remote diagnostic system based on the analysis of the data, wherein sending the communication from the remote diagnostic system comprises at least one of sending repair information to a third party, sending a parts request to a third party, sending a service request notification to a third party, and sending a revised set of operating instructions to the at least one electronic system based on the analysis of the data by the remote diagnostic system, the revised set of operating instructions at least one of correcting a failure and preventing a failure of the at least one electronic system.

13. The method of claim 12, further comprising verifying that operation of the at least one electronic system using the revised set of operating instructions is within specification.

14. The method of claim 12, further comprising determining a revised set of operating instructions based on the analysis of the data, wherein sending the communication from the remote diagnostic system comprises sending a revised set of operating instructions to the at least one electronic system.

15. The method of claim 14, further comprising verifying that operation of the at least one electronic system using the revised set of operating instructions is within specification.

16. The method of claim 12, wherein analyzing the data is based on at least one of a threshold analysis, a statistical analysis, a signature analysis, a trend analysis, a timing analysis, an event sequence analysis, a pattern analysis, an image processing technique, a quantitative state estimation technique, a qualitative state estimation technique, a model-based diagnostic technology, a look-up table, a neural-network-based analysis, a fuzzy-logic-based analysis, a bayesian network, a causal network, a rule-based system analysis and an expert system.

17. The method of claim 12, wherein obtaining data includes detecting a signature waveform of a part of the at least one electronic system.

18. The method of claim 17, further comprising digitizing the signature waveform.

19. The method of claim 18, further comprising:

remotely analyzing the digitized waveform; and sending a communication from the remote diagnostic system based on the analysis of the digitized waveform.

20. A computer-readable storage medium containing instructions for automated diagnosis or prognosis of at least one electronic system, the instructions being executable to perform steps comprising:

receiving data pertaining to the at least one electronic system when the data has been selectively transmitted based upon an initial diagnosis;

analyzing the data; and generating a communication from the remote diagnostic system based on the analysis of the data, wherein the instructions that generate the communication include at least one of instructions that generate repair data and instructions that transmit the repair data to a third party, instructions that generate a parts request and instructions that transmit the parts request to a third party, instructions that generate a service request notification and instructions that transmit the service request notification to a third party, and instructions that generate a revised set of operating instructions based on the analysis of the data by the remote diagnostic system and instructions that transmit the revised set of operating instructions to the at least one electronic system, the revised set of operating instructions at least one of correcting a failure and preventing a failure of the at least one electronic system.

21. The computer-readable storage medium of claim 20, further containing instructions executable to transmit the communication over the distributed network.

22. The computer-readable storage medium of claim 20, further containing instructions executable to verify that operation of the at least one electronic system according to the revised set of operating instructions is within specification.

23. The computer-readable storage medium of claim 20, wherein the instructions that obtain data include instructions that detect a signature waveform of a part of the at least one electronic system.

24. The computer-readable storage medium of claim 23, further containing instructions that digitize the signature waveform.

25. A computer-readable storage medium containing instructions for automated diagnosis or prognosis of at least one electronic system, the instructions being executable to perform steps comprising:

receiving a signature waveform pertaining to the at least one electronic system when the signature waveform has been selectively transmitted based upon an initial diagnosis;

analyzing the signature waveform; and generating a communication to a remote diagnostic system, the communication including a revised set of operating instructions based on the analysis of the signature waveform.

26. The computer-readable storage medium of claim 25, wherein the instructions that analyze the signature waveform include instructions for signature analysis.

27. A system for automated diagnosis or prognosis of at least one electronic system, the system comprising:

a first computer-readable storage medium containing instructions executable to perform steps of obtaining data pertaining to the at least one electronic system, analyzing the data to obtain an initial diagnosis, and selectively transmitting the data to a remote diagnostic system based on the initial diagnosis; and a second computer-readable storage medium containing instructions executable to perform steps of receiving the data when the data has been selectively transmitted based upon the initial diagnosis, further analyzing the data, and generating a communication from the remote diagnostic system based on the further analysis of the data, wherein the communication from the remote diagnostic system comprises at least one of repair information to a third party, a parts request to a third party and a revised set of operating instructions to the at least one electronic system based on the analysis of the data by the remote diagnostic system, the revised set of operating instructions at least one of correcting a failure and preventing a failure of the at least one electronic system.

* * * * *